United States Patent [19]

Kupka et al.

[11] 3,943,425
[45] Mar. 9, 1976

[54] CONTROLLED SINGLE PULSE BLOCKING CONVERTER

[75] Inventors: Detlef Kupka; Alfred Oberhuber, both of Munich, Germany

[73] Assignee: Siemens Aktiengesellschaft, Berlin & Munich, Germany

[22] Filed: Apr. 4, 1974

[21] Appl. No.: 457,824

[30] Foreign Application Priority Data

Apr. 9, 1973 Germany............................ 2317774

[52] U.S. Cl. ....................... 321/2; 331/112; 321/18
[51] Int. Cl.² ........................................ H02M 3/335
[58] Field of Search ............ 321/2, 18; 323/DIG. 1; 331/111, 112

[56] References Cited
UNITED STATES PATENTS

| | | | |
|---|---|---|---|
| 3,515,974 | 6/1970 | Stich ........................................ | 321/2 |
| 3,564,393 | 2/1971 | Williamson ............................. | 321/2 |
| 3,602,801 | 8/1971 | Williamson ............................. | 321/2 |
| 3,736,491 | 4/1972 | Kuster .................................... | 321/2 |

OTHER PUBLICATIONS
(S3056 0015) IEEE Transactions on Industry Applications, Vol. IA-8, No. 4, pp. 437–442, Jul./Aug. 1972.

*Primary Examiner*—William M. Shoop
*Attorney, Agent, or Firm*—Hill, Gross, Simpson, Van Santen, Steadman, Chiara & Simpson

[57] ABSTRACT

A single pulse blocking converter for generating of a constant output voltage has a switching transistor and a transformer wherein a feedback effect of the transformer supplies the base current of the switching transistor by way of the collector-emitter path of a driving transistor. The driving transistor is controlled by means of a control transistor in dependence upon a measured voltage which is in proportion to the output voltage of the blocking converter. The circuit is particularly characterized in that an auxiliary circuit is provided with a transistor which, during the transition of the switching transistor from the conductive into the blocked condition, applies a blocking voltage to the control path of the switching transistor and in that, by means of a periodic resetting of the auxiliary circuit by the pulses from a pulse generator, the blocking voltage is switched off and a new switching period is initiated for the switching transistor.

2 Claims, 1 Drawing Figure

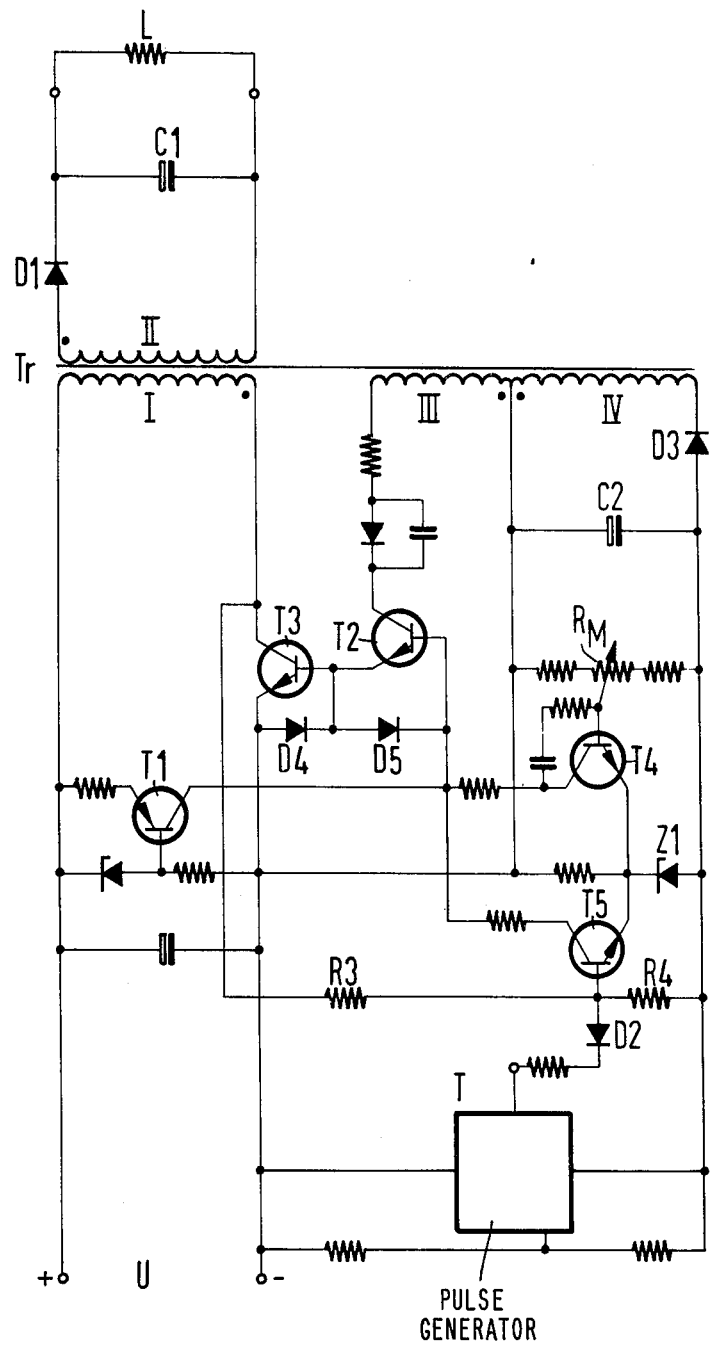

3,943,425

CONTROLLED SINGLE PULSE BLOCKING CONVERTER

BACKGROUND OF THE INVENTION

1. Field of the Invention

This invention relates to a single pulse blocking converter for the creation of a constant output voltage, and more particularly to such a blocking converter having a switching transistor and a transformer wherein a feedback effect of the transformer supplies the base current of the switching transistor by way of the emitter-collector path of a drive transistor, and the driving transistor is controlled by means of a control transistor in accordance with the voltage which is in proportion to the output voltage of the blocking converter.

2. Description of the Prior Art

A circuit arrangement of the general type noted above is disclosed in the publication "Elektronische Rundschau", Nov. 6, 1963, Page 291, illustration 4; however, this circuit does not have the advantageous benefits set forth below which are provided by the present invention.

SUMMARY OF THE INVENTION

The object of the present invention is to eliminate, in blocking converters, the disadvantage of a strong dependency of the switching frequency on the input voltage and on the load.

According to the invention, the aforementioned object is achieved through the provision of an auxiliary circuit in which a transistor is provided which, during the transition of the switching transistor from the conducting condition into the blocking condition, applies a blocking voltage to the control path of the switching transistor, and a pulse generator is provided to generate periodic pulses which effect a periodic resetting of the auxiliary circuit so that the blocking voltage is switched off and the initiation of a new switching period of the switching transistor is provided.

According to the invention, an arrangement of the converter in Telex machines and data recorders advantageously renders such apparatus independent of network fluctuations such as may occur, for example, during the operation of such devices in airplanes, ships or in regions with uncontrolled network voltages. Such fluctuations can have very negative effects, in particular in devices equipped with integrated circuits.

BRIEF DESCRIPTION OF THE DRAWING

Other objects, features and advantages of the invention, its organization, construction and operation will be best understood from the following detailed description of an exemplary embodiment of the invention, taken in conjunction with the accompanying drawing, on which the single FIGURE is a schematic circuit diagram of a controlled single pulse blocking converter constructed in accordance with the principles of the invention.

DESCRIPTION OF THE PREFERRED EMBODIMENT

A blocking converter circuit, which is known in principle, basically comprises a switching transistor T3, the oscillation transformer Tr having a primary winding I and a feedback winding III in the base circuit of the switching transistor and a secondary winding II and a diode D1, a smoothing capacitor C1 and a load resistor L. This basic circuit is fed from a voltage source U.

It is a main feature of the blocking converter that magnetic energy which is accepted during a conductive condition of the switching transistor T3 is only released by a respective poling of the diode D1 during the blocking phase of the switching transistor T3.

In order to obtain a controlled output voltage of the blocking converter, the transformer Tr is provided with a further winding IV which, together with a rectifier diode D3 and a charging capacitor C2, creates a measuring voltage which is in proportion to the output voltage. Part of this measuring voltage is compared with a reference voltage created at a Zener diode Z1 via a measuring voltage divider $R_M$ connected in the control circuit of a control transistor T4. The control amplifier controls a driver transistor T2 whose emitter-collector path is connected in series with the feedback winding III in the base-emitter circuit of the switching transistor T3.

A constant current circuit having a transistor T1 supplies the maximum base current for the driver transistor T2 and the switching transistor T3 which become conductive. The output voltage is then applied to the transformer winding I. The voltage which is induced in the feedback winding III of the transformer drives a collector current, via the transistor T2, which switches through the switching transistor T3. The collector current of the switching transistor T3 increases because of the constant inductivity of the transformer, in a linear way, until the current amplifier of the switching transistor prevents a further increase. The switching transistor then takes up voltage and switches off the current.

The voltage at the inductance reverses polarity and effects a release of the magnetic energy to the load circuit, which means current flows by way of the diode D1 into the load capacitor C1 and via the diode D3 into the capacitor C2 and the measuring voltage divider $R_M$.

The control transistor T4 compares the voltage created at the measuring winding IV and across the capacitor C2 with the reference voltage of the Zener diode Z1. If the voltage at the capacitor C2, which is in proportion to the output voltage at the load L, becomes too large, a part of the base current of the driver transistor T2 is released by way of the control transistor T4. The maximum value of the collector current to the switching transistor T3 will be smaller during the next passing phase and, therefore, also the accepted energy will be smaller.

The frequency dependence of the switching frequency of the blocking converter is eliminated by an auxiliary circuit comprising a voltage divider R3, R4, a pulse generator T which provides repetitive pulses and a transistor T5 which operates as a switch and which is controlled by the voltage divider and the pulse generator. The voltage divider is located parallel to a series circuit consisting of the emitter-collector path of the switching transistor and the capacitor C2 which conducts the rectifying measuring voltage. The junction in the voltage divider is connected with the base of the transistor T5. In the conductive condition of the transistor T5, the measuring voltage drives a current toward the capacitor C2 by way of the diodes D4 and D5 which are, in each case, connected parallel to the emitter-base path of the switching and driving transistor with such a polarity that at both control paths a definitive blocking voltage is created. This blocking voltage is only removed if the pulse generator, which may be a flip-flop circuit, goes into the negative flip-flop condition for a short time. When this happens, the transistor T5 is blocked and the switching transistor T3 is activated ($U_{CE} \approx 0V$.)

The voltage which is divided by the resistors R3, R4 is now so small that the transistor T5 can no longer be activated. When bringing the pulse generator back, a coupling diode D2 prevents a reactivation of the transistor T5. Only if the switching transistor T3 blocks and accepts voltage at its emitter-collector path is blocking voltage applied during the remainder of the duration of the period.

The activation time of the switching transistor depends on the input voltage and on the load performance. In case of input voltages which exceed the nominal input voltage, or in the case of partial loading, respectively, the magnetic flux in the transformer may be zero during a certain time.

The pulse generator T which may be designed as an integrated circuit is fed by the measuring voltage, as indicated in the drawing.

Although we have described our invention be reference to a particular illustrative embodiment thereof, many changes and modifications of the invention may become apparent to those skilled in the art without departing from the spirit and scope of the invention. We therefore intend to include within the patent warranted hereon all such changes and modifications as may reasonably and properly be included within the scope of our contribution to the art.

We claim:

1. A single pulse blocking converter for generating a constant output voltage, comprising:

a transformer including an input winding, an output winding for providing an output voltage, a feedback winding and a measuring winding;

a switching transistor including a base, an emitter and a collector, the collector-emitter path of said switching transistor connected in series with said input winding;

a driving transistor for driving said switching transistor to conductive and blocked conditions including a base, an emitter, and a collector, the collector-emitter path of said driving transistor connected to said feedback winding and to the base of said switching transistor to supply base current thereto;

a control transistor for controlling said driving transistor including a base, an emitter and a collector, the base-emitter path of said control transistor connected to said measuring winding and the emitter-controller path connected to the base-emitter circuits of said driving and switching transistors to control the operation of said driving transistor in accordance with the voltage developed at said measuring winding which is proportional to the output voltage; and an auxiliary circuit comprising generating means for producing periodic pulses and a further transistor including a base, an emitter and a collector, said base connected to said pulse generating means and to said collector of said switching transistor, and the collector-emitter path of said further transistor connected in parallel with the collector-emitter path of said control transistor, said further transistor operable to apply a blocking voltage to said switching transistor during the transition of said switching transistor toward the blocked condition and remove the blocking voltage in response to a potential shift of a pulse from said generating means.

2. The blocking converter of claim 1, comprising a diode a reference voltage source; and a voltage divider connected in parallel to the collector-emitter path of said switching transistor and connected to said reference voltage source; said base of said further transistor connected to said voltage divider, the emitter-collector path of said further transistor connected to the base of said switching transistor so that said reference voltage source is applied as a blocking voltage source to said base of said switching transistor, said base of said further transistor connected to said generating means via said diode.

* * * * *